United States Patent [19]

Wallgren et al.

[11] 4,259,356

[45] Mar. 31, 1981

[54] METHOD FOR THE PRODUCTION OF PROTEIN CONCENTRATE

[75] Inventors: Kurt Wallgren; Tage Nilsson, both of Gothenburg, Sweden

[73] Assignee: Mjölkcentralen Arla Ekonomisk Förening, Gothenburg, Sweden

[21] Appl. No.: 962,335

[22] Filed: Nov. 20, 1978

[30] Foreign Application Priority Data

Nov. 23, 1977 [SE] Sweden .............................. 7713274

[51] Int. Cl.$^3$ .............................................. A23J 1/20
[52] U.S. Cl. ...................................... 426/42; 426/580; 426/583; 426/657; 426/613; 260/120
[58] Field of Search ................ 426/42, 580, 582, 657, 426/613; 260/120

[56] References Cited

U.S. PATENT DOCUMENTS

| | | | |
|---|---|---|---|
| 999,083 | 7/1911 | Baechler | 260/120 |
| 1,557,181 | 10/1925 | Messmer | 260/120 |
| 3,298,836 | 1/1967 | Ernstrom | 426/582 |
| 4,020,186 | 4/1977 | Edwards | 426/582 |
| 4,066,800 | 1/1978 | Rosenau et al. | 426/582 |

*Primary Examiner*—Jeanette M. Hunter
*Attorney, Agent, or Firm*—Larson, Taylor and Hinds

[57] ABSTRACT

A method for preparing a protein concentrate useful in the production of a low calorie margarine of water-in-oil type which comprises acidifying a raw material comprising skimmed milk, skim milk powder or a mixture thereof to a pH of 4–5 to precipitate protein therefrom, heating the acidified raw material in a first heating stage to a temperature of about 35°–65° C. and maintaining said temperature for a period of at least 15 minutes, then quickly raising the temperature of the acidified milk in a second heating stage to a temperature of about 60°–95° C. and immediately after reaching the intended temperature, concentrating the precipitated protein and cooling the resulting concentrate.

9 Claims, 1 Drawing Figure

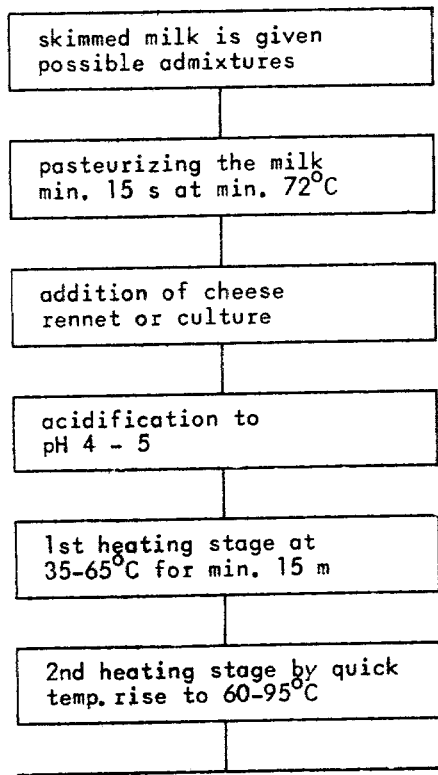
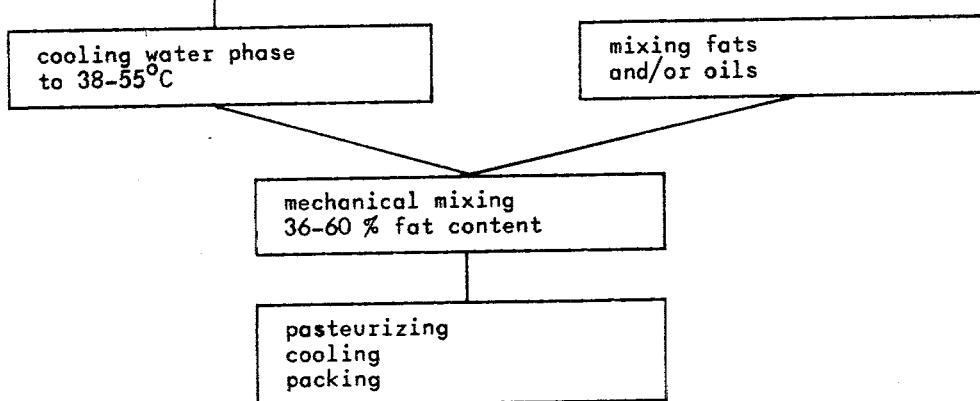

METHOD FOR THE PRODUCTION OF PROTEIN CONCENTRATE

BACKGROUND OF THE INVENTION

1. Field of the Invention

The present invention relates to a method for the production of a protein concentrate useful in the manufacture of margarine of the type which has a low calorie value and a high content of proteins. More particularly the invention relates to a method for the production of a protein concentrate from skimmed milk for subsequent use in the manufacture of so-called low calorie margarine of water-in-oil type having a fat content of 35-60 percent.

2. Description of the Prior Art

A method for the production of low calorie margarine of the water-in-oil type is previously known in which a water phase is emulsified in a fat phase and in which the water phase is produced from a protein concentrate from buttermilk emanating from a butter and/or butteroil manufacturing process. Such a protein concentrate from buttermilk has good water keeping properties and emulsifying properties and is well suited for the production of low calorie margarine. The supply of buttermilk, however, is relatively restricted whereas the supply of skimmed milk is relatively good. Consequently, it has been desirable to produce a low calorie margarine of water-in-oil type having a high protein content, in which the protein concentrate for said low calorie margarine is obtained from skimmed milk.

A method for the production of low calorie margarine is also previously known in which the water phase is produced with skimmed milk as the starting material and in which the protein comprises milk casein obtained by precipitation with an acid. In this method a water-in-oil emulsion is obtained by dispersing up to 60% water phase in down to 40% fat phase in a closed cooling and crystallization system at a temperature at which the fat begins to crystallize. Before the water phase is dispersed in the fat phase the protein containing water phase is heated to a temperature of between 65° and 80° C. and is kept at said temperature for a period of between 10 and 30 minutes.

This previously known method involves some disadvantages, which are mainly based on the difficulty of obtaining a stable emulsion having as high content of water phase as, for example, up to 60% and the difficulty of obtaining a product having a microbiological keepability. In the known method it is considered necessary to keep the pH-value at a relatively low level and less than 6, and a pasteurization must be made at a high temperature for a long period of time in order to obtain a product which is sufficiently stable and substantially free of microbiological changes. The precipitation of the proteins from the starting material in this method is a time consuming operation and acids must be added. Also in order to make emulsification of the water phase in the fat phase possible the fat phase must be cooled before mixing the two phases together. Furthermore, in the production of the water phase mineral acids and organic acids are added which necessarily influence the composition of the protein concentrate. The added chemicals thereafter must be washed out by an expensive and complicated process before the protein concentrate is mixed into the fat phase. As a result a large amount of the valuable so called "whey proteins" are lost since they cannot be precipitated by an ordinary acidification.

Also previously known is a method for the production of a low calorie margarine having a protein concentrate from skimmed milk wherein the milk raw material is first acidified to pH 5.1–5.8, and is thereafter subjected to a membrane filtering, and the resulting protein concentrate is then subjected to a special thermic treatment. By virtue of the membrane filtering a relatively large amount of the whey proteins is obtained which proteins cannot be precipitated by acidification. The whey proteins obtained in this matter change the character of the protein concentrate to give improved water-keeping and emulsifying properties. It is necessary in the membrane process, however, that particular apparatus be available which can be relatively expensive.

Protein concentrate for low calorie margarine of water-in-oil type having a high protein content also can be manufactured from different caseins, but problems appear in such manufacture, for example, bad taste such as a glue taste.

Another possible protein raw material might be quark. It is however, difficult to provide the desired product with sufficiently high dry substance content and protein content using quark as the protein material. Normal quark also is a product which is difficult to handle and which causes difficulties in separation, pumping and cooling. These difficulties are especially accentuated at such long operation periods which are necessary in the manufacture of low calorie margarines on an industrial scale.

Furthermore, quark contains a large number of added bacteria and other bacteria which unfavourably influence the bacteriological quality of the final product and when storing a final product prepared using quark it develops proteinases. This is especially obvious after a free storing and following thawing both of the protein concentrate (the quark) and the ready product (the low calorie margarine). In addition, quark contains rennet enzyme. The bacteria and other enzymes may give poor taste like a cheese taste.

SUMMARY OF THE INVENTION

It is an object of the invention therefore to provide a protein concentrate obtained from skimmed milk useful in the manufacture of low calorie margarine of the water-in-oil type which method eliminates the aforementioned problems encountered in the production of low calorie margarine (dairy spread) of the water-in-oil type.

It is also an object of the invention to provide a method for the production of a protein concentrate from skimmed milk which need not be membrane filtered, pasteurized at high temperatures of between 65° and 80° C. for a long period, and be supplied with mineral acids or organic acids, and which must be washed to remove the mineral acids or organic acids from the protein concentrate before use in the manufacture of low calorie margarine.

Further objects of the invention are to obtain a protein concentrate useful as the water phase emulsified with the oil or fat phase in the manufacture of low calorie margarine of water-in-oil type to reduce viscosity of the protein concentrate at separation and handling, to control the water keeping property and the emulsifying property of the protein concentrate, to increase its solid and protein content, to reduce the content of bacteria and to inactivate enzymes, which among other things may give a bad or false taste.

These objects are obtained by subjecting a raw material selected from skimmed milk, skim milk powder or mixtures thereof to a sequence of defined heat treatments after acidifying the raw material to a pH of about 4–5 to precipitate protein therefrom. In accordance with the method the acidified raw material is heated in a first heating stage to a temperature of about 35°–65° C., preferably 52°–55° C. in order to make it possible to subsequently heat the raw material to the highest temperature that the protein can stand without loosing its water-keeping and emulsifying properties. To ensure a sufficiently strong heat treatment the acidified milk raw material is kept at this temperature for a predetermined period (at least 15 minutes). The heat treatment is carried through in heat treatment cells or tanks for the purpose, among other things, of dissociating calcium from the casein. Depending on the gases which are enclosed or dissolved in the milk, foam is formed when the product expands in the heat treatment cell or tank. By floatation, the protein of the milk is thereby drawn upwards to the foam and is partly dehydrated. This foam formation leads to a grain formation and loss of water-keeping and emulsifying properties during the subsequent heat treatment separation step of the method of the invention. The foam formation can be prevented in different ways, for instance, by keeping the heat treatment tank or cells under pressure or by using bacteria cultures which give a low content of gas as for instance, cottage cheese culture or cheddar cheese culture. In addition, introduction of air must be minimized through the process until the product is subjected to the commencing heat treatment at 35°–65° C.

The foam formation can also be eliminated by adding a suitable foam-reducing agent like lecithin.

After the first heat treatment at about 35°–65° C. the temperature of the acidified milk is raised to the highest temperature that the protein can stand, preferably to a temperature of about 60°–95° C. at the pH area of 4–5. By the two heat treatments is obtained the intended inactivation of enzymes and bacteria and a control of the water-keeping and emulsifying properties of the protein. After the second heat treatment, that is, immediately after the intended temperature is reached the protein is separated off to provide a protein concentrate having the desired protein and solids contents with the desired water-keeping and emulsifying properties. The separated protein concentrate is then cooled down to at least the emulsification temperature.

The production of the water phase includes eight steps which are preferably carried out successively one after the other. The fat phase production and the emulsification to the low calorie margarine of water-in-oil type may be carried out in three additional steps.

The invention will now be described in more detail with reference to the eight steps.

Step 1

If desired, a protein like for instance whey protein or reconstituted milk powder may be added to the skim milk raw material. The raw material may also be given an addition of salts like citrate or phosphate in order to stabilize the albumin and/or to reduce the influence of season variations on the milk.

Step 2

The skimmed milk is subjected to a pasteurizing heat treatment, which may range from a temperature of 72" C. for 15 seconds to an ultra high temperature and a corresponding temperature/time relationship depending on the season and the yield desired.

Step 3

The skimmed milk is preferably given a slight addition of cheese rennet to stabilize the protein particles. Preferably cheese rennet is added in an amount of 5–40 ml per 1000 liters of skimmed milk.

Step 4

In this step the skimmed milk is made acid at a suitable temperature by means of non-gas forming acid which consequently does not result in the formation of carbon dioxide or any other as during the acidification. The milk is acidified to a pH value of between 4 and 5. Cottage cheese or cheddar cheese culture may be added to prevent formation of foam during the following heat treatment.

Step 5

The acidified milk is heated in a first heating step to a temperature of about 35°–65° C., preferably 52°–55° C., and the milk is kept at this temperature for at least 15 minutes and up to 60 minutes or more depending upon the particular temperature employed. At temperatures adjacent the upper temperature limit a short temperature keeping period can be used, but at temperatures adjacent the lower limit the temperature ought to be kept for longer periods. The heat treatment is preferably conducted in a heat exchanger having a minimum temperature difference between the heating medium and the product. By this heat treatment of the skimmed milk the precipitated protein gets a consistency which is suited to separation or to precipitation thereof in any other way, and the heat treatment of the protein gives the protein good water-keeping and emulsifying properties.

Step 6

However, the temperature used in step 5 is too low to enable a separation so as to get a protein having a sufficiently high dry substance content and a sufficiently reduced bacteria and enzyme content. Therefore, the skimmed milk is subjected to a momentary temperature increase up to 60°–95° C., preferably 65°–70° C. This high temperature should be maintained for as short a period as possible, and the temperature rise (generally of at least 10° C.) may be established by steam injection directly into the skimmed milk or onto the tube in which the skimmed milk is transported from the place where it was subjected to the long temperature treatment according to step 5. It is important that the temperature of 60°–95° C. is not maintained but momentarily since otherwise the protein may bake on the equipment at the same time as the protein looses its water-keeping property. Thus grains may be formed or similar problems may appear making subsequent concentration of the protein concentrate difficult. On the other hand, it is important that the skimmed milk be subjected to the increased temperature in the said second temperature step since this reduces the viscosity and thereby facilitates the concentration of the protein concentrate. It has proved that it is possible by the said second temperature treatment to prevent or eliminate the appearance of an unwanted cheese taste.

Step 7

In direct connection to the momentary temperature rise according to step 6 the protein is concentrated as quickly as possible, preferably by being separated. This gives a protein concentrate of 20–24% which mainly contains casein but which also contains some amount of whey proteins. It has been proven that the protein concentrate thus produced has good water-keeping and emulsifying properties and is well suited to the manufacture of low calorie margarine of the water-in-oil type.

Step 8

As previously mentioned, the protein concentrate from skimmed milk is very sensitive to high temperatures and if the high temperature from step 7 is maintained for too long a period the protein quickly grows grainy, its water-keeping property is reduced and whey falls out. It is therefore important that the protein concentrate is cooled, and if the protein concentrate is not used immediately for the manufacture of low calorie margarine, it is important to cool the protein concentrate immediately after the separation to a temperature of less than 8° C. The protein concentrate ought to be used as soon as possible for the manufacture of low calorie margarine, but at a temperature of less than 8° C. the protein may without disadvantage be stored for two or three days.

Instead of using fresh skimmed milk, the method of the invention contemplates use of skim milk powder which as usual is dissolved or reconstituated in water and is thereafter subjected to the above described treatment according to steps 1-8. A protein concentrate produced from skim milk powder gives the same good results as does a protein concentrate produced from fresh skimmed milk. Upon need or if considered advisable a protein concentrate produced from skimmed milk according to the described method may also be mixed with a suitable butter milk protein concentrate for the subsequent manufacture of low calorie margarine.

Diagrammatically, the above described production method can be illustrated as shown in the appended flow diagram.

EXAMPLE I 4500 liters of skimmed milk was heated momentarily to 87° C. and then cooled to 20° C. Thereafter 0.7% cottage cheese acid and 90 ml rennet was added. The coagulate was broken at pH 4.6 and it was thereafter heated to 55° C. and was kept at said temperature for 30 minutes. Thereafter the milk was transferred to a quark separator by means of a positive controllable pump. Just before the separation the temperature of the milk was raised to 68° C. by direct injection of steam. In this case the milk could not stand a higher temperature without the risk of grain formation and loss of water-keeping properties. The separation of the milk was carried out to obtain a protein concentrate of 20-4% which contained both casein and some portion of whey protein. The protein concentrate was then stored at a temperature of 4°-8° C. The protein concentrate thus obtained had an even and smooth consistency without any hard lumps and it proved to have good water-keeping property and was well suited for manufacture of low calorie margarine of water-in-oil type having a high protein content and a fat content of only about 40%.

EXAMPLE II 450 kg skim milk powder was reconstituted with 1550 liters water and was allowed to swell to 7° C. for 24 hours. Thereafter additionally 2500 liters water was added and the milk was treated in direct connection thereto as described in Example I.

The protein concentrate thereby obtained had a smooth consistency without any hard lumps and its water keeping property was good.

EXAMPLE III 20 kg whey protein powder having a protein content of 65% was dissolved in 50 liters skimmed milk and was allowed to swell at 7° C. for 24 hours, whereafter it was added to 4450 kg skimmed milk. The skim milk mixture wastreated as in Example I except that the temperature of the skim milk mixture was raised to 78° C. by means of direct steam injection immediately after the separation. In this case it proved that the milk could stand the said high temperature.

Also in this case the protein concentrate obtained had good water keeping property and did not contain any hard lumps.

EXAMPLE IV

To 4500 liters skimmed milk was added 3 kg dinatriumhydrogen phosphate and 3 kg natrium nitrate. Thereafter the milk was treated in the same way as in Example I except that the temperature of the milk was raised to 80° C. by means of direct steam injection just before the separation.

In all examples the protein concentrate proved to have an even and smooth consistency and did not contain any hard lumps. It had a good water keeping property and the protein concentrate was well suited for manufacture of low calorie margarine of the water-in-oil type. When analyzed and evaluated a low calorie margarine manufactured from protein concentrate according to the invention it proved to be fully equal in merit to low calorie margarine manufactured from butter-milk protein concentrate as described in U.S. Pat. No. 3,922,376.

As aforementioned, the protein concentrate in the form of a water phase can be emulsified with an oil or fat phase directly to form a margarine of the water-in-oil type. Preparation of the fat phase and emulsions using the protein concentrate are described below in more detail.

Production of the fat phase

Step 9

Independently of the production of the water phase a fat phase is produced from oils and/or fats. The oils can be butter oil, preferably mixed with oils having a large amount of polyunsaturated fats like soy oil, sunflower oil or other vegetable oils. To the oil mixture or some part thereof can be added such oil soluble additives as, for instance, a small amount of emulsifiers if emulsifiers are to be used. Normally there is need for only a small amount of emulsifier since the protein concentrate produced according to the invention has very good water-keeping and emulsifying properties. To the fat phase may also be added vitamins, for instance, in the form of vitaminized oil. The temperature of the fat phase is maintained at a temperature of about 38°-55° C., preferably 45°-50° C. If considered necessary the mixed oils and fats can be stored in a buffer station.

Emulsification

Step 10

In this step the emulsification is performed by successively adding the water phase at a temperature of about 38°-55° C., preferably 45°-50° C., to the fat phase which has the same temperature. The addition of water phase can be made by batches or continuously and is made under strong mechanical mixture, whereby the water phase is emulsified in the fat phase to directly form a water-in-oil emulsion. By time a careful check can be made both of the fat content of the emulsion and that the emulsion is of the water-in-oil type. The fat content is controlled by the addition of water phase so that the fat content falls in the range of 35–65%, preferably 39–41%. In this step aromas or flavoring agents may be added, if desired.

Step 11

After the emulsification the product can be made ready in any conventional way by pasteurizing the product, preferably at 72° C. for 15 seconds although lower temperatures with correspondingly longer period of time or alternatively higher temperature with correspondingly shorter period can be used. Then the product is cooled to a temperature below 12° C. and the cooled product is packed, hermetically sealed in any conventional way and stored.

The following examples illustrate preparation of low calorie margarines using the protein concentrate as the water phase.

EXAMPLE V

Independently of the water phase production described above, in Example I, a fat phase was produced by mixing oils and fats. The water phase was successively mixed into the fat phase with vigorous mechanical mixing and the fat content and the emulsion type was checked. The emulsion was formed by mixing 60% water phase into 40% fat phase while both the water phase and the fat phase were at a temperature of about 45°–50° C. The resulting mixture was pasteurized in a tank of 72° C. for 15 seconds and thereafter cooled in a two stage scraper cooler, first to a temperature of 18° C. and thereafter to a temperature of 10° C.

The resulting product had a butter-like taste and appearance, was free of hard lumps, and had an even and smooth consistency. The emulsion proved to have good keepability upon storing, and when analyzed and evaluated it proved to be completely comparable to low calorie margarines manufactured according to any other method.

EXAMPLE VI

A water phase was produced as described in Example II and emulsified with a fat phase as described and carried out in Example V. A product was obtained which had good taste and appearance, and was free of lumps and had a smooth consistency. The emulsion of the product was stable, and of the water-in-oil type.

EXAMPLE VII

A water phase was produced as described in Example III and emulsified with a fat phase as described in Example V. Again a product was obtained being a stable emulsion and having a smooth consistency without lumps.

EXAMPLE VIII

A water phase was produced as described in Example IV and emulsified with a fat phase as described in Example V.

Again, a product was obtained being a stable emulsion of the water-in-oil type. The product had a good taste and appearance and a smooth consistency without lumps.

It is claimed:

1. A method for the production of a protein concentrate useful in the production of margarine having a low calorie content and a high content of proteins which comprises:
   acidifying a raw material selected from the group consisting of skimmed milk, an aqueous solution of skim milk powder and a mixture thereof to a pH of 4–5 to precipitate proteins therefrom, said proteins comprising casein and whey proteins,
   raising the acidified raw material including said precipitated proteins to a temperature of about 35°–65° C. and maintaining said temperature in a first heating stage for a period of at least 15 minutes depending upon the particular temperature employed, thereby conditioning the precipitated proteins,
   quickly raising the temperature of the acidified and conditioned raw material including said precipitated proteins in a second heating stage at least 10° C. to a temperature of about 60°–95° C. to inactivate bacteria and enzymes,
   immediately after reaching the intended higher temperature, concentrating the precipitated proteins to provide a liquid protein concentrate comprising both casein and whey proteins and
   cooling the resulting liquid protein concentrate, to storing temperature.

2. A method according to claim 1 wherein 5–40 ml cheese rennet per 1000 liters of raw material mixture is added to said raw material before the acidification.

3. A method according to claim 1 wherein the first heating stage is conducted at a temperature of 52°–55° C.

4. A method according to claim 1 wherein raising of the temperature in said heating stage is effected by injection of water steam directly into the raw material or onto a tube in which the raw material is transported.

5. A method according to claim 1 wherein the acidified milk during the second heating stage is conducted a temperature of 65°–70° C.

6. A method according to claim 1 wherein lecithin is added to said raw material in an amount effective to reduce the foam formuation during the heating in the first heating stage.

7. A method according to claim 1 wherein whey protein is added to said raw material before the first heat treatment.

8. A method according to claim 1 wherein citrate or phosphate salts are added to said raw material before the first heat treatment in an amount effective to stabilize the albumin and/or compensate for reason variations in said raw material.

9. A method according to claim 1 wherein a culture selected from the group consisting of a cottage cheese culture and cheddar cheese culture is added to the raw material before acidification in an amount of 5–40 ml of culture per 1000 liters of raw material.

* * * * *